(12) United States Patent
Blaicher et al.

(10) Patent No.: US 12,204,154 B2
(45) Date of Patent: Jan. 21, 2025

(54) LOCALIZATION OF OPTICAL COUPLING POINTS

(71) Applicant: Karlsruher Institut für Technologie, Karlsruhe (DE)

(72) Inventors: Matthias Blaicher, Ettlingen (DE); Philipp-Immanuel Dietrich, Worth (DE); Christian Koos, Siegelsbach (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 209 days.

(21) Appl. No.: 17/905,379

(22) PCT Filed: Mar. 4, 2021

(86) PCT No.: PCT/EP2021/055415
§ 371 (c)(1),
(2) Date: Aug. 31, 2022

(87) PCT Pub. No.: WO2021/175967
PCT Pub. Date: Sep. 10, 2021

(65) Prior Publication Data
US 2023/0120780 A1    Apr. 20, 2023

(30) Foreign Application Priority Data

Mar. 5, 2020 (DE) ............ 10 2020 202 821.4

(51) Int. Cl.
*G02B 6/42* (2006.01)
*G01B 11/00* (2006.01)
*G01N 21/64* (2006.01)

(52) U.S. Cl.
CPC ............ *G02B 6/422* (2013.01); *G01B 11/002* (2013.01); *G01N 21/64* (2013.01)

(58) Field of Classification Search
CPC .... G02B 6/422; G02B 6/2555; G02B 6/4221; G01B 11/002; G01N 21/64; G01N 21/636; B33Y 30/00
See application file for complete search history.

(56) References Cited

U.S. PATENT DOCUMENTS

2006/0067625 A1    3/2006  Hasegawa
2011/0085437 A1*   4/2011  Ito ............................ G11B 7/26
                                                    428/141

(Continued)

FOREIGN PATENT DOCUMENTS

EP        0757226 A2    2/1997
JP        H0572000 A    3/1993

(Continued)

OTHER PUBLICATIONS

Hasegawa, Masaki et al. "Alignment method of polymer waveguide and optical component using fluorescence." Japanese journal of applied physics 44.8L (2005): L1085 (Year: 2005).*

(Continued)

*Primary Examiner* — Dominic J Bologna
*Assistant Examiner* — Carlos Perez-Guzman
(74) *Attorney, Agent, or Firm* — Woodard, Emhardt, Henry, Reeves & Wagner, LLP

(57) ABSTRACT

The invention relates to a method and to an assembly (200) for localizing an optical coupling point (11) and to a method for producing a microstructure (100) at the optical coupling point (11). The method for localizing an optical coupling point (11) comprises the following steps: a) providing an optical component (10), which comprises an optical coupling point (11), the optical coupling point having an interaction region (15) lying outside of a volume encompassed by the optical component (10); b) producing optical radia- (Continued)

tion in a production region (120), the production region (120) overlapping at least partly with the interaction region (15) of the optical coupling point (11), light being applied to a medium (19) located in the production region (120), which light is modified by the medium (19) in such a way that the optical radiation is thereby produced; c) sensing at least part of the produced optical radiation in a sensing region (130), the sensing region (130) overlapping at least partly with the interaction region (15) of the optical coupling point (11), and determining a spatially resolved distribution of the sensed part of the produced optical radiation; and d) determining the localization of the optical coupling point (11) from the determined spatially resolved distribution of the sensed part of the produced optical radiation, the optical radiation being produced or at least the part of the produced optical radiation being sensed through the optical coupling point (11). The optical coupling point (11) can thereby be precisely localized with a relative positioning tolerance of better than 1 μm. Thus, low coupling losses of an optical connection to the optical component (10) can be achieved and microstructures (100) can be precisely placed at the optical coupling point (11).

14 Claims, 5 Drawing Sheets

(56) References Cited

U.S. PATENT DOCUMENTS

| | | | |
|---|---|---|---|
| 2013/0302905 A1* | 11/2013 | Kalkbrenner | G02B 21/16 436/172 |
| 2015/0292981 A1 | 10/2015 | Norwood et al. | |
| 2017/0336326 A1 | 11/2017 | Sirat et al. | |
| 2021/0048435 A1* | 2/2021 | Belushkin | G01N 33/54346 |

FOREIGN PATENT DOCUMENTS

| | | |
|---|---|---|
| JP | H0843689 A | 2/1996 |
| JP | 2006091759 A | 4/2006 |
| JP | 2016057405 A | 4/2016 |
| WO | 2017059960 A1 | 4/2017 |
| WO | 2018024872 A1 | 2/2018 |
| WO | 2019083773 A1 | 5/2019 |

OTHER PUBLICATIONS

Schumann, M., Bückmann, T., Gruhler, N. et al. Hybrid 2D-3D optical devices for integrated optics by direct laser writing. Light Sci Appl 3, e175 (2014), (Year: 2014).*

Katagiri et al., Optical microscope observation method of a single-mode optical-fiber core for precise core axis alignment, In: Journal of Lightwave Technology, 2(3), 1984, pp. 277-28, 7 pages, Jan. 1, 1984.

Denk et al., Two-photon laser scanning fluorescence microscopy, Science vol. 248, No. 4951, 1990, pp. 73-76, 6 pages, Jan. 1, 1990.

Taillaert et al., Compact efficient broadband grating coupler for silicon-on-insulator waveguides, Optics Lett. 29 (23), 2004, pp. 2749-2751, 3 pages, Jan. 1, 2004.

Behfar et al., Horizontal cavity surface-emitting laser (HCSEL) devices, Vertical-Cavity Surface-Emitting Lasers IX. vol. 5737, International Society for Optics and Photonics, 2005, 8 pages, Jan. 1, 2005.

Hasegawa, Alignment Method of Polymer Waveguide and Optical Component Using Fluorescence, In: Japanese Journal of Applied Physics, Japan Society of Applied Physics, JP, vol. 44, No. 33-36, pp. L1085-L1087, 3 pages, Jan. 1, 2005.

Masters, Review of Handbook of Biological Confocal Microscopy, Third Edition, Journal of Biomedical Optics 13(2), 029902, 2008, 3 pages, Jan. 1, 2008.

* cited by examiner

LOCALIZATION OF OPTICAL COUPLING POINTS

FIELD OF THE INVENTION

The present invention is in the field of optical connection of optical components by using an optical coupling point and relates to a method and an arrangement for localizing an optical coupling point and also a method for producing a microstructure at an optical coupling point. The optical components can be for example micro-optical components such as lasers, optical fibers, optical chips with passive or active waveguides, photodetectors, lens systems, or optical filters. Other types of optical components are conceivable. The present methods and arrangement are usable in particular in integrated optics and optical construction and connection technology. However, further areas of use are possible.

PRIOR ART

Methods and arrangements for localizing an optical coupling point are known from the prior art. Depending on the type of optical component, the position and orientation of the optical coupling point can be captured in particular by using a combination of camera images and a confocal detection method of an imaging system, which can be part of a lithography system. In this context, it may often be necessary for the optical components to be transparent to the light used for detecting the coupling point and/or to have a contrast with regard to refractive index, color or reflection, said contrast being recognizable by using an imaging optical device. However, this is not the case in many material systems. In the field of integrated optics, for example, optical fibers, optical fiber arrays or material systems for integrated optical chips exhibit a very low refractive index contrast, which makes it significantly more difficult to recognize waveguides at the optical coupling point. Furthermore, optical chips or individual layers of these chips may not be transparent at the wavelengths used for detecting the coupling points; this is applicable particularly if the waveguide to be detected is covered by metallizations. Moreover, many optical components do not have optically verifiable supplementary structures, such as alignment marks, for example, which can be used as a basis for ascertaining the position and/or orientation of the optical coupling point.

As described in Katagiri, T. et al., *Optical microscope observation method of a single-mode optical-fiber core for precise core axis alignment*, Journal of Lightwave Technology, 2(3), 1984, pages 277-28, the technical requirement that often arises particularly in the case of optical fibers is that of recognizing their cores as precisely as possible, which is necessary primarily when two optical fibers are joined together in so-called "splicing methods". Despite the low refractive index contrast of customary optical fibers, it is possible to recognize interfaces between fiber core and cladding of the optical fiber given suitable rear-side collimated flood exposure in optical microscopes during viewing from above by virtue of slight shadowing. In this context, it is necessary for the fiber axis to be situated approximately in the focal plane of the microscope. However, in many cases it is not possible to implement a rear-side collimated flood exposure. In this regard, in optical modules, such as optical transmitters, for example, optical fibers and waveguides are usually secured on nontransparent substrates, and so a rear-side illumination is not possible. In further cases, the optical fibers are combined to form fiber arrays, with the result that a weak core shadow is superimposed by other structures having higher optical contrast in the fiber array and recognition is thus made significantly more difficult.

US 2006/0067625 A1 discloses an apparatus and method which adjust an optical connection between a waveguide and an optical connection component that introduces light into the waveguide or receives light emitted from the waveguide. The apparatus comprises an excitation light source, which emits light into the waveguide via the optical connection component, said light causing the waveguide to fluoresce; an observation unit, which observes the waveguide from a side face, said side face being different than the end face via which light is coupled into the waveguide or is emitted from the latter, and which receives fluorescent light emitted from the waveguide; and a connection adjusting component, which adjusts the optical connection between the optical connection component and the waveguide on the basis of the intensity of the received fluorescent light.

WO 2017/059960 A1 discloses a further method for recognizing the fiber core of an optical fiber when viewing a facet from above, the viewing direction being oriented perpendicular to the facet and parallel to the axis of the fiber core. In order to improve the visibility of the fiber core at one end, light can additionally be coupled into the fiber core from the other end of the fiber. However, it is necessary for the light coupled out from the fiber core to be collected by the system used for imaging. This proves to be difficult in particular if the optical unit of a lithography system is intended to be used for imaging. The axes of the optical fiber or of the optical waveguide to be localized are often situated in the focal plane of the lithography system, with the result that the light coupled out along the axis is not verifiable even with the aid of objectives having a high numerical aperture.

WO 2018/024 872 A1 discloses a method and a device for lithographically producing a target structure on a non-planar initial structure by exposing a photoresist by using at least one lithography beam. The method comprises the following steps: a) capturing a topography of a surface of a non-planar initial structure; b) using at least one test parameter for the lithography beam and ascertaining an interaction of the lithography beam with the initial structure and the resultant change in the lithography beam and/or the target structure to be produced; c) determining at least one correction parameter for the lithography beam in such a way that the change in the lithography beam and/or the target structure to be produced that is caused by the interaction of the lithography beam with the initial structure is reduced; and d) producing the desired target structure on the initial structure by exposing the photoresist by using the at least one lithography beam using the at least one correction parameter for the lithography beam.

As described e.g. in Barry R. Masters, Review of *Handbook of Biological Confocal Microscopy*, Third Edition, Journal of Biomedical Optics 13(2), 029902, 2008, imaging methods from the field of fluorescence microscopy can likewise be used for localizing an optical coupling point. For this purpose, fluorescence radiation in a sample to be examined can be excited in a spatially resolved manner and/or verified in a spatially resolved manner and the resultant contrast can be used for imaging.

According to Denk, Winfried, James H. Strickler, and Watt W. Webb, *Two-photon laser scanning fluorescence microscopy*, Science Vol. 248, No. 4951, 1990, pages 73-76, the spatially resolved excitation can also be effected by using multi-photon absorption processes.

OBJECT OF THE INVENTION

Based on this disclosure, the object of the present invention comprises providing a method and an arrangement for localizing an optical coupling point and also a method for producing a microstructure at the optical coupling point, which at least partly overcome the aforementioned disadvantages and limitations of the prior art. The method and the associated arrangement are intended to be suitable in particular for use in lithography systems that can be used to produce very precisely structures aligned with the optical coupling point, such as e.g. optical waveguides, lenses, mirrors or other functional elements that are optically linked to the coupling point to be detected or are aligned therewith. In order to attain the lowest possible coupling losses during the optical connection between the optical coupling point to be localized and the lithographically produced structures, it is desirable for the optical coupling point to be localized as precisely as possible with regard to position and orientation in the coordinate system of the lithography unit. A relative positioning tolerance of preferably better than 1 μm, particularly preferably better than 200 nm, in particular better than 50 nm, is particularly desirable for this purpose.

DISCLOSURE OF THE INVENTION

This object is achieved by using a method and an arrangement for localizing an optical coupling point and also by using a method for producing a microstructure at the optical coupling point having the features of the independent patent claims. Advantageous embodiments, which are implementable individually or in any desired combination, are presented in the dependent claims.

Hereinafter the terms "have", "encompass", "comprise" or "include" or any grammatical departures therefrom are used non-exclusively. Accordingly, these terms can refer either to situations in which, besides the features introduced by these terms, no further features are present, or to situations in which one or more further features are present. By way of example, the expression "A has B", "A encompasses B", "A comprises B" or "A includes B" can refer either to the situation in which, apart from B, no further element is present in A (i.e. to a situation in which A exclusively consists of B), or to the situation in which, in addition to B, one or more further elements are present in A, for example element C, elements C and D or even further elements.

Furthermore, it is pointed out that the terms "at least one" and "one or more" and grammatical modifications of these terms, if they are used in association with one or more elements or features and are intended to express the fact that the element or feature can be provided singularly or multiply, generally are used only once, for example when the feature or element is introduced for the first time. When the feature or element is subsequently mentioned again, the corresponding term "at least one" or "one or more" is generally no longer used, without restricting the possibility that the feature or element can be provided singularly or multiply.

Furthermore, hereinafter the terms "preferably", "in particular", "for example" or similar terms are used in conjunction with optional features, without alternative embodiments being restricted thereby. In this regard, features introduced by these terms are optional features, and the scope of protection of the claims, and in particular of the independent claims, is not intended to be restricted by these features. In this regard, the invention, as will be recognized by the person skilled in the art, can also be carried out using other configurations. In a similar way, features which are introduced by "in one embodiment of the invention" or by "in one exemplary embodiment of the invention" are understood as optional features, without alternative configurations or the scope of protection of the independent claims being intended to be restricted thereby. Furthermore, all possibilities of combining the features introduced by the introductory expressions with other features, be they optional or non-optional features, are intended to remain unaffected by these introductory expressions.

In a first aspect, the present invention relates to a method for localizing an optical coupling point, which method comprises the following steps, which are preferably carried out in the indicated order, beginning with step a) and ending with step d), wherein one or more, in particular directly successive, steps can at least in part also be carried out simultaneously:

a) providing an optical component comprising an optical coupling point, wherein the optical coupling point has an interaction region lying outside a volume encompassed by the optical component;

b) producing optical radiation in a production region, wherein the production region at least partly overlaps the interaction region of the optical coupling point, wherein light impinges on a medium situated in the production region, said light being modified by the medium in a manner that the optical radiation is thereby produced;

c) capturing at least one part of the produced optical radiation in a capture region, wherein the capture region at least partly overlaps the interaction region of the optical coupling point, and ascertaining a spatially resolved distribution of the captured part of the produced optical radiation; and d) determining the localization of the optical coupling point from the ascertained spatially resolved distribution of the captured part of the produced optical radiation, wherein producing the optical radiation or capturing at least part of the produced optical radiation is effected through the optical coupling point.

Step a) involves providing an optical component. The term "optical component" denotes at least one optical element designed for emitting, receiving, altering or transferring light. The optical component can for example comprise an optical fiber or else for example be applied on a planar substrate or on a non-planar substrate and preferably be producible by a two- or three-dimensional microstructuring method. In the case of a substantially planar structure, the optical component can, if appropriate, also be referred to as an "optical chip". In this case, an optical component can comprise a single optical element or a plurality of optical elements. Preferably, the optical component is selected from the group comprising light guiding single-mode or multimode fibers composed of organic or inorganic materials, semiconductor-based integrated optical chips, in particular lasers, optical amplifiers, photodiodes, superluminescence diodes or silicon photonics chips, integrated optical chips based on semiconductors or dielectric materials, preferably glasses, silicon dioxide, silicon nitride or polymers; optical circuit boards, or optical elements for free space optics, in particular lenses, beam splitters, isolators, thin-film filters, mirrors, or diffraction gratings. The optical components can comprise optical waveguides with low index contrast, e.g. glass-based optical waveguides, or waveguides with medium or high index contrast, e.g. semiconductor-based waveguides. Further types of optical components are conceivable, in particular filters, power splitters or electro-optical modulators. The optical component can furthermore comprise in principle any desired combinations of the optical elements mentioned.

The optical component provided in accordance with step a) comprises an optical coupling point. The term "optical coupling point" denotes a partial region of the optical component to be connected via which light can be coupled into the component or can be emitted from the latter. In simple optical components, such as e.g. optical fibers or edge emitting integrated optical chips, the optical coupling point is often also referred to as a "facet" or "waveguide facet". In the case of photodiodes, the optical coupling point is often identical with a so-called "active area" of the pn junction used for verification, within which area the incident light leads to the production of an electrical signal. In the case of lasers, it can be the light emitting area at the edge or on the surface of the corresponding chip. More complex embodiments of optical coupling points can be configured for example as so-called grating couplers (see Taillaert, Dirk, Peter Bienstman, and Roel Baets, *Compact efficient broadband grating coupler for silicon-on-insulator waveguides*, Optics Lett. 29 (23), 2004, pages 2749-51) in silicon photonics or as so-called "inverse tapers" or etched micromirrors (see Behfar, Alex et al., *Horizontal cavity surface-emitting laser (HCSEL) devices*, Vertical-Cavity Surface-Emitting Lasers IX. Vol. 5737, International Society for Optics and Photonics, 2005). The optical coupling points can already comprise beam shaping elements produced by multi-photon polymerization or can be provided with these elements.

The optical coupling point has an interaction region. In this case, the term "interaction region" of the optical coupling point relates to a spatial region which interacts optically with the coupling point. A selected point of a spatial region interacts with the optical coupling point (1) if light emitted from the optical coupling point can at least partly reach the selected point of the spatial region, or (2) if optical radiation emitted by an isotropically radiating point light source positioned at the selected point of the spatial region can be at least partly coupled into the optical coupling point.

The selected point of the spatial region lies within a so-called "emission region" of the optical coupling point in case (1), and within a so-called "acceptance region" of the optical coupling point in case (2). The emission region of the coupling point can be described here according to a customary definition in the context of so-called "Gaussian beams" as follows: a point belongs to the emission region of the optical coupling point if the intensity—measured at the point—of the light emitted by the optical coupling point amounts to more than $1/e^2$ times the maximum intensity value measured at the same distance from the optical coupling point, for example on the axis of the Gaussian beam. The acceptance region can be defined in a similar way as follows: a point belongs to the acceptance region of the optical coupling point if an input coupling efficiency of the light emitted by a point light source at the point amounts to more than $1/e^2$ times the maximum input coupling efficiency attained by a point light source positioned optimally at the same distance from the optical coupling point, for example on the axis of the Gaussian beam. Depending on the respective application, some other factor, for example 0.01 (−20 dB) or 0.001 (−30 dB), can also be used instead of the aforementioned factor of $1/e^2$. The interaction region assigned in each case to a selected optical coupling point can alternatively thus also be referred to as "acceptance region" or as "emission region". In one particularly preferred configuration of the present invention, the interaction region lies outside a volume encompassed by the optical component. In an alternative configuration, however, the interaction region can wholly or partly also encompass the volume of the optical component or of a waveguide core comprised by the optical component. In the case of an exemplary optical component comprising a simple waveguide with the optical coupling point arranged at the end of said waveguide, the interaction region can have a conical volume, also referred to as "acceptance cone" or "emission cone".

Step b) involves producing optical radiation in a spatial region referred to as "production region". The terms "producing" and "production" with regard to the optical radiation denote provision of optical radiation, in particular by radiating light into the production region, wherein the light can be modified in the production region in such a way that the optical radiation is thereby produced. In this case, the radiation can be produced using various effects based for example on light scattering, phosphorescence, fluorescence, luminescence or related processes. In the case of processes based on light absorption and downstream emission, the simultaneous or sequential absorption of a plurality of photons can also be used. In this case, the optical radiation used for excitation can be provided by the optical coupling point itself or by a separate optical system that can be configured for producing a laser beam.

The term "light" denotes photons which are provided by a light source and which produce the desired optical radiation in the production region. The light which is radiated into the production region for the purpose of producing the optical radiation can be provided as optical waves having a constant power or in the form of short light pulses, that is to say that the light source can be configured as a continuous wave light source or as a pulsed light source. In the case of a pulsed light source, it is possible to use light pulses having a pulse duration of preferably at most 10 ps, preferably of at most 1 ps, particularly preferably at most 200 fs, in particular at most 100 fs, with a repetition rate of preferably at least 1 MHz, preferably of 10 MHz, particularly preferably of at least 25 MHz, in particular of at least 100 MHz. What are suitable for this purpose are in particular laser light sources selected from fiber-based femtosecond lasers or pulsed solid-state lasers such as titanium:sapphire lasers or diode lasers that can be combined with frequency conversion units, for example for frequency doubling, for summation frequency production or for difference frequency production. In this preferred configuration, the light source can be used in particular to excite the luminescence of multi-photon absorption processes. By way of example, in this case, it is also possible to use multi-stage absorption processes for exciting the luminescence radiation, wherein one part of the excitation or de-excitation light can be radiated into the production region via the optical component, and a further part via the objective.

The optical radiation produced in accordance with step b) can comprise in principle any type of optical radiation having a wavelength in the range of the optical spectrum or an adjacent spectral range. While the visible optical spectrum has wavelengths of 380 nm to 780 nm, the infrared spectral range encompasses wavelengths of 780 nm to 1 mm, in particular of 780 nm to 3 μm, (near infrared, "NIR") or of 3 μm to 8 μm (mid infrared, "MIR"), and the ultraviolet spectral range encompasses wavelengths of 1 nm to 400 nm, preferably of 100 nm to 400 nm, in particular of 400 nm to 315 nm ("UV-A"), of 315 nm to 280 nm ("UV-B") or of 280 nm to 100 nm ("UV-C").

In accordance with step b), the production region at least partly overlaps the interaction region of the optical coupling point. In this case, the two regions can have an overlap region which is smaller than each of the two regions; alternatively, the two regions can be totally identical or one of the regions can be completely encompassed by the respective other region.

Step c) involves capturing at least one part of the produced optical radiation in a capture region and also ascertaining a spatially resolved distribution of the captured part of the produced optical radiation, wherein the capture region at least partly overlaps the interaction region of the coupling point. Here, too, the two regions can have an overlap region which is smaller than each of the two regions; alternatively, the two regions can be totally identical or one of the regions can be completely encompassed by the respective other region.

The terms "capturing" and "capture" with regard to the produced optical radiation denote metrological recording of the optical radiation or part thereof, in particular with regard to the power thereof, wherein the captured radiation can be subjected to further modifications, in particular filtering with regard to a wavelength or a polarization, before the power is determined. In one case, in which the optical coupling point is used for capturing the produced optical radiation, it is possible to metrologically record how well the optical radiation can couple from a respective production location in the production region into the optical coupling point. In another case, in which a separate optical system is used for capturing the produced optical radiation, the optical system can metrologically record in particular a power of the optical radiation or of part thereof at a respective production location in the production region. In both cases it is sufficient for one part of the optical radiation produced in a region of overlap between the production region and the capture region to be captured, while another part of the optical radiation can be emitted in spatial directions that cannot be captured by a measuring unit configured for capturing the optical radiation.

With regard to the spatially resolved distribution, the terms "ascertaining" and "ascertainment" relate to a determination of the spatially resolved distribution of the part of the produced optical radiation captured in the capture region, in particular by verification and evaluation of recorded measurement values and/or by applying a model for the optical coupling point or the interaction region of the optical coupling point. The term "spatially resolved distribution" with regard to optical radiation denotes a variable which is specified as a function of a spatial position, preferably in the form of a position vector in a three-dimensional coordinate system, within a spatial region. The variable used in this case can be, in particular location-dependently, a power of the captured optical radiation or an input coupling efficiency of the optical power produced by the optical system at the respective spatial position.

Step d) involves the desired determination of the localization of the optical coupling point from the spatially resolved distribution—ascertained during step c)—of the part of the produced optical radiation captured within the capture region. The term "localization" encompasses both an indication concerning a spatial position and an indication concerning an orientation of the optical coupling point or of the interaction region of the optical coupling point. In this case, the indications concerning the spatial position can comprise in particular a position vector in a coordinate system, preferably a three-dimensional coordinate system. The indications concerning orientation can comprise in particular one or more three-dimensional orientation vectors, particularly preferably in the same coordinate system that is also used for the indication of the position vector, one of the orientation vectors preferably indicating a direction in which light can be emitted from the optical coupling point or from which efficient input coupling of the light into the optical coupling point is possible. As explained in greater detail below, in one particularly preferred configuration, the position vector and the orientation vector can be indicated in a three-dimensional coordinate system defined by a lithography system used in a lithography method. In the case of divergent beams, an optical axis of a beam of rays emitted by the optical coupling point or of a beam of rays received by the optical coupling point can be used for describing the orientation of the optical coupling point or of the interaction region of the optical coupling point. In addition, at least one further orientation vector can be indicated, in particular an orientation vector which defines a rotational orientation of the coupling point in relation to an optical axis, and which thus indicates in particular a spatial direction of a polarization of the light emitted by the coupling point or captured by the latter.

With regard to the localization of the optical coupling point, the terms "determining" or "determination" denote an ascertainment of one variable from other variables which were captured metrologically or were ascertained on the basis of a model. Consequently, both the position and the orientation of the optical coupling point can be determined from the spatially resolved distribution—ascertained during step c)—of the part of the produced optical radiation captured in the capture region. In addition to the position and the orientation of the optical coupling point, it is furthermore possible also to obtain information about a lateral shape of the interaction region and/or other location-dependent properties of the interaction, such as e.g. a polarization dependence. The position and the orientation of the optical coupling point or of the interaction region of the optical coupling point can usually be deduced directly from the spatially resolved distribution—determined in accordance with step c)—of the power captured in the capture region. In this case, the position of the coupling point can often constitute a location having an extremely small lateral extent of the interaction region, for example a vertex of a conical spatial region. Alternatively or additionally, an observation or model-based expectation that optical radiation is not appreciably excited within the optical component, in particular within a waveguide comprised by the latter, can have an influence for determining the position and the orientation of the optical coupling point. As a result, there generally occurs at the coupling point an appearance or disappearance of the captured optical radiation, in particular in the form of an abrupt contrast, which can be used for determining the position of the optical coupling point. If the optical radiation is locally excited by a separate optical system comprising an objective, then it can be particularly advantageous to detect, in addition to the radiation coupled into the optical component through the optical coupling point, also parts of the radiation that is produced overall in a medium but is not coupled through the optical coupling point into the optical component and captured there. In this case, detection can be effected by using the objective used for excitation or by using an additional objective. Furthermore, an interaction region to be expected for the optical coupling point is generally calculable or able to be modelled, in particular by applying Kirchhoff's diffraction integral. By comparing the model-based interaction region or the model-based distribution of the captured optical power with the optical power determined metrologically within the capture region, the position of the optical coupling point and of its interaction region can be deduced in this case. It thus becomes possible to determine the position and the orientation of the optical coupling point without that section of the spatial region which comprises the optical coupling point actually being captured metrologically. The position and the orientation of the optical coupling point can then be ascertained for example by extrapolation of the distribution of the captured radiation determined in the interaction region. In this regard, it is sufficient, for example, in the case of a cone-shaped interaction region, to capture only the widened region of the cone, while the position of the vertex of the cone is determined by extrapolation.

In one particular configuration, the localization of the optical coupling point can be determined at a wavelength of the produced radiation and/or of the light used to produce said radiation which is different than the operating wavelength of the optical component. In this configuration, chromatic effects can occur such as, for example, a wavelength-dependent refraction of the optical radiation at an interface, which effects can be compensated for by a model. In a further configuration, the position and the orientation of the optical coupling point are sufficiently wavelength-insensitive, and so there is no need to compensate for chromatic effects.

According to the invention, the way in which the optical radiation is produced in the production region is unimportant as long as producing the optical radiation or capturing the spatially resolved distribution of the optical radiation, i.e. preferably (1) either producing the optical radiation or
(2) alternatively capturing the spatially resolved distribution of the optical radiation, is effected through the optical coupling point. In case (2), the spatially resolved distribution of the optical radiation captured through the coupling point can be determined for example by the optical radiation being produced sequentially at various points within or outside the interaction region with a known spatial distribution, and the optical power that is captured metrologically through the coupling point reflecting the location dependence of the input coupling efficiency and thus the shape of the interaction region. In this case, the term "through the optical coupling point" denotes a configuration according to the invention with regard to the guidance of the optical radiation or of the light that produces the optical radiation in a manner such that the optical radiation or the light that produces the optical radiation actually traverses the optical coupling point. Only in this way can it be ensured that the spatially resolved distribution of the captured optical radiation actually indicates the localization of the optical coupling point or of the associated interaction region.

For the production of the optical radiation in the production region, the production region at least partly comprises a medium which modifies the incident light in such a way that the optical radiation is thereby produced. For this purpose, the production region can be wholly or partly filled by the medium, the term "medium" relating to a substance configured for producing the optical radiation from the light radiated into the production region. Providing the medium in the production region thus makes it possible to solve in particular the problem that light emitted by the optical component often cannot be efficiently coupled into the objective or that, conversely, the light radiated into the spatial region through an objective often cannot be efficiently radiated into the optical component. In this case, advantageously, the medium can wholly or at least partly fill a region of overlap between the production region and the capture region. In one particularly preferred configuration, a partial region of the production region or of the capture region can in each case be addressed in temporal succession. This can be done using a scanning method which can alter a relative position of the objective with respect to the optical component, for example. Alternatively, it is also possible to employ stationary objectives and to achieve scanning with the aid of scanning mirrors that can be used to address specific partial regions of the production region or of the capture region. Alternatively or additionally moreover it is also possible to use detector arrays or image sensors, such as e.g. CCD or CMOS arrays, in combination with stationary objectives for spatially resolved capture of radiation.

In one preferred configuration, the medium situated in the production region can comprise scattering centers which scatter incident light in such a way that scattered radiation is thereby produced, which as the desired optical radiation can wholly or at least partly fill the capture region. In an alternative, likewise preferred, configuration, the medium situated in the production region can comprise a luminescent dye, in which case the luminescent dye, upon light impinging thereon, produces luminescence radiation which as the desired optical radiation can likewise wholly or at least partly fill the production region. In this case, single-photon or multi-photon absorption processes can be used for exciting the luminescence. In this case, the term "luminescence" describes light emission by a substance configured to be put into an excited state by absorption of energy, reversion to the ground state taking place by way of emission of radiation. If the emission of the radiation takes place directly after the absorption of the light, the term "fluorescence" is usually used for this, whereas the term "phosphorescence" is used when there is a longer time duration until reversion to the ground state. Other types of luminescence are conceivable, however. Alternatively, a starting material configured for producing the luminescent dye can also be situated in the production region, in which case the starting material, upon the incident light impinging thereon, firstly produces the luminescent dye, which then produces the desired luminescence radiation upon further impingement of the light, said luminescence radiation arising as the optical radiation in the production region. Further types of media are conceivable.

In one particular configuration, the optical component can wholly or partly comprise the medium which modifies the incident light such that the optical radiation is thereby produced. In this case, the medium can preferably be present within the optical component in the form of a waveguide core, into which scattering or luminescent substances are introduced. Alternatively or additionally, an intrinsic fluorescence of the material of the waveguide can be used for this purpose.

In a further configuration, the medium can comprise a photoresist, in which case a dose introduced into the photoresist for the purpose of producing the optical radiation is preferably below a dose threshold for polymerization of the photoresist. The term "photoresist" can alternatively be rendered in German by the term "Photoresist", too, instead of the term "Fotolack". In this case, the photoresist can comprise scattering centers or a luminescent dye. In this case, preferably, an excitation wavelength, a power, a pulse shape or an irradiation duration for producing the optical radiation by using the luminescent dye can be chosen in such a way that no unintentional exposure of the photoresist takes place. After the optical coupling point has been localized in accordance with the method described herein, a microstructure can be produced in accordance with the method— explained in greater detail below—for producing a microstructure at the optical coupling point thus localized.

In one preferred configuration of the present invention, the light can be emitted by the optical component through the optical coupling point such that the light propagates into the interaction region or into the emission region of the optical coupling point and produces the desired optical radiation there, which is captured in a spatially resolved manner through an objective and is evaluated. Since it is generally not possible for the light emitted by the optical component to be directly captured even with objectives having a high numerical aperture (NA), in particular introducing scattering centers or luminescent dyes into the interaction region makes it possible to capture the desired optical radiation in the entire interaction region or at least one part thereof. A spatially resolved detection of the optical radiation captured by the objective thus makes possible a direct measurement of at least one partial region of the interaction region of the optical coupling point. The spatially resolved detection of the optical radiation can be effected according to known methods of microscopy, preferably using a camera or a confocal microscope.

In a further preferred configuration of the present invention, the light can be emitted by a separate optical system comprising an objective such that the light propagates into the interaction region or the acceptance region of the optical coupling point and produces the desired optical radiation there, which is captured by the optical component through the optical coupling point and is evaluated. Since it is also generally not possible for the light emitted by the objective to be directly coupled into the optical component even with objectives having a high numerical aperture (NA), in particular the above-described introduction of scattering centers or luminescent dyes into the interaction region of the optical coupling point makes it possible to produce the desired optical radiation in the entire interaction region or at least one part thereof and to couple it into the optical coupling point. The capture of the optical radiation coupled into the optical component, preferably having a waveguide, can preferably be effected directly at an output of the optical component. For this purpose, at the output of the optical component, preferably a measuring unit, particularly preferably a power detector, in particular in the form of an optical power measuring head, can be fitted, which can additionally be provided with filters, for example for capturing specific wavelengths or polarization states. This configuration can be advantageous in particular for optical fibers, such as e.g. single- or multi-core fibers. However, the power detector can also be provided as part of the optical component, for example in the case of integrated photodiodes which can be configured to capture at least one part of the power of one or more waveguides. In addition, the optical radiation coupled in can also be captured by the very objective used for excitation, in which case, as described below, output coupling points on the optical component itself can be used. Alternatively, it is also possible to use additional objectives for capturing the optical radiation. Generally, for metrologically capturing the optical radiation, a lock-in principle can be used in order to be able to distinguish background radiation, such as e.g. an external illumination, from optical radiation produced for detecting the coupling point.

In one particular configuration, output coupling structures at the optical component, in particular on a waveguide comprised by the optical component, which lie within the field of view that is addressable by the objective, can be used to emit part of the optical power coupled into the optical component in the direction of the objective again in such a way that said part can be captured through the objective. For this purpose, it is also possible to use scattered radiation emitted by the waveguide, in particular on account of imperfections, for example surface roughnesses, of the waveguide or by way of scattering structures produced for this purpose. In this particular configuration, the optical radiation produced in the interaction region of the coupling point can have a wavelength which is different than the operating wavelength of the waveguide, with the result that the capture of the scattered radiation produced by the waveguide by way of emission elements need not necessarily be accompanied by losses at the operating wavelength itself. For example, it is possible to use waveguide sections made from so-called "sub-wavelength gratings", "SWGs" for short, which lead to an emission of the optical radiation produced in the acceptance volume, while they do not influence, or do not critically influence, optical signals at the operating wavelength of the optical component. Furthermore, partial regions of the waveguide can be provided with additional dyes that can be excited by the optical radiation coupled in, in which case emitted light coupled out from the waveguide can likewise be captured by the objective.

In a further embodiment, the optical component can have a group of optical coupling points, in which case it can be advantageous for the optical radiation coupled into the entire group to be captured integrally, in particular if the interaction regions assigned to the individual optical coupling points have sufficiently large spatial regions that do not overlap one another. One example of this is a multi-core fiber with a common photodetector fitted at the end of the multi-core fiber, the active area of said photodetector extending over all cores of the multi-core fiber.

In a further aspect, the present invention relates to an arrangement for localizing an optical coupling point, wherein the arrangement comprises:—
- an optical component comprising at least one optical coupling point, wherein the optical coupling point has an interaction region lying outside a volume encompassed by the optical component;
- an optical device configured for producing optical radiation in a production region and/or for capturing at least one part of the produced optical radiation in a capture region, wherein the production region and the capture region at least partly overlap the interaction region of the optical coupling point; and
- an evaluation unit configured for ascertaining a spatially resolved distribution of a captured part of the optical radiation and for determining the localization of the optical coupling point from the ascertained spatially resolved distribution of the captured part of the optical radiation, wherein the arrangement is configured in a manner that producing the optical radiation or capturing at least the part of the produced optical radiation is effected through the optical coupling point.

The term "optical device" denotes a device which is configured for producing and for capturing optical radiation and comprises optical components configured for this purpose, in particular a light source configured to allow light to impinge on the medium situated in the production region, which light source can radiate light into the production region via the optical coupling point or via an optical system, a measuring unit, in particular in the form of a power detector, which is configured for capturing at least one part of the produced optical radiation in a capture region and which can be comprised by the optical component or the optical system or which can comprise constituents of the optical component and constituents of the optical system, and can comprise an optical system configured for transferring and optionally for modifying produced and/or captured optical radiation.

Preferably, in this case, the light source can be configured as a pulsed light source used for producing light pulses having a pulse duration of at most 10 ps, preferably at most 1 ps, particularly preferably at most 200 fs, in particular at most 100 fs, with a repetition rate of at least 1 MHz, preferably of at least 10 MHz, particularly preferably of at least 25 MHz, in particular of at least 100 MHz. In particular laser light sources such as fiber-based femtosecond lasers or pulsed solid-state lasers such as titanium:sapphire lasers are suitable for this purpose. Alternatively, a continuous wave light source can also be used.

As already mentioned, the light source is preferably configured for radiating the light at least into a spatial region which comprises a medium for producing the optical radiation by modifying the incident light. The spatial region in which the optical radiation is produced by a modification of the incident light caused by the medium is also referred to hereinafter as production region. The production region at least partly overlaps the interaction region of the optical coupling point. In this case, the two regions can have an overlap region that is smaller than each of the two regions; alternatively, the two regions can be totally identical or one of the regions can be completely encompassed by the respective other region. For further details with regard to the medium and the advantageous configurations thereof, reference is made to the rest of the description. Preferably, in this case, a refractive index of the medium can be matched to the refractive index of an objective configured for radiating in the light or for capturing the produced optical radiation, in particular in order to improve a resolution of the objective.

As already mentioned, the term "optical system" denotes a device which is comprised by the optical unit and which is configured for transferring and optionally for modifying produced and/or captured optical radiation and for this purpose comprises at least one optical element, preferably at least one optical lens, either the production or the capture of optical radiation being possible in a spatially resolved manner. For a given vacuum operating wavelength $\lambda$ of the optical component, the spatial resolution of a production process or of a capture process is preferably from $0.01\lambda$ to $100\lambda$, particularly preferably from $0.05\lambda$ to $10\lambda$, in particular from $0.1\lambda$ to $10\lambda$. In one particularly preferred configuration, the optical system configured for producing or capturing the optical radiation in the spatial region comprises at least one objective. Preferably lithography objectives having a high numerical aperture (NA) are suitable for achieving a high spatial resolution. In this case, the term "high numerical aperture" preferably denotes a numerical aperture of the objective of more than 0.3, particularly preferably more than 0.6, in particular more than 0.8 or even more than 1.0. Particularly during the application of the method described in greater detail below for producing a microstructure at the optical coupling point, preferably by using three-dimensional direct writing laser lithography, the same objective that is also used for producing the microstructure can be used for capturing or producing the optical radiation. Besides a reduced number of components, this has the advantage that possible imaging aberrations of the objective, such as e.g. an image field distortion, are of no consequence or are at least partly compensated for. In one particular configuration, the objective can in this case be in direct contact with a photoresist serving as an immersion medium. Said photoresist can also simultaneously serve as a medium for modifying the incident light and for producing the optical radiation in a manner associated therewith. In this case, in one preferred embodiment, the photoresist can be admixed with substances which, with the aid of the incident light, allow the optical radiation to be produced by way of light scattering, phosphorescence, fluorescence, luminescence or related processes.

For ascertaining the spatially resolved distribution of part of the captured optical radiation, preferably a position of a spatial element in which optical radiation is produced by modification of the incident light or produced radiation is captured can be moved through the production region or the capture region and a dependence of the power of the captured radiation on the position of the spatial element can be determined in the process. For this purpose, preferably, it is possible to use a beam scanner which, via the production region or the capture region, allows a rapid deflection of the incident beam or of the captured beam in particular perpendicular to the beam direction. The beam scanner can preferably be selected from a so-called "galvo-scanner" and a mirror scanner based on micro-electromechanical systems (MEMS). The movement of the incident or captured beam along the beam direction can be achieved with the aid of a movement of the objective and/or of the optical component. Alternatively, other arrangements can also be employed, in particular 3D scanners based on spatial light modulators or deformable mirrors. Further configurations, in particular based on methods from confocal microscopy or laser scanning microscopy (LSM), are conceivable. In this case, the beam scanner can also be used for lithographically producing microstructures.

In one particularly preferred configuration, the measuring unit for ascertaining the spatially resolved distribution of the optical radiation captured within the capture region can comprise a power detector, the power detector being configured for determining an optical power of the optical radiation. As already explained above, the power detector can be provided in particular in the form of an optical power measuring head. Preferably optical filters and/or beam splitters can be used for selecting the captured optical radiation. In particular, in this case, the optical filter can comprise a spectral filter which can be configured for separating the scattered radiation and the luminescence radiation. The filters used can also serve for capturing selected wavelengths or polarization states. For determining the power of the optical radiation, what are advantageous are in particular low noise power detectors with a high sensitivity for detecting small optical powers, in particular p-i-n diodes with low noise electronic amplifiers or photomultipliers. Alternatively or additionally, the power detector can form a part of the optical component, for example in the case of integrated photodiodes. The measuring unit can be configured as an integral constituent of the optical component or of the optical system or comprise constituents of the optical component or constituents of the optical system. In particular, a photodiode embodied as a constituent of the optical system can be used for detecting the optical radiation, while the capture, amplification and evaluation of the electrical signal produced in the process can be effected by correspondingly configured functional units of the optical system. In a further, likewise preferred, embodiment, the optical radiation coupled in can be captured by the very objective used for excitation, in which case, as described above, output coupling points on the optical component itself can be used. Alternatively, it is possible to use additional objectives for capturing the optical radiation. For verifying the radiation, in all embodiments it is possible to use a lock-in measurement principle in order to be able to distinguish background radiation, e.g. an external illumination, from the optical radiation produced in the production region.

The evaluation unit configured for determining the localization of the optical coupling point from the captured spatially resolved distribution of the optical radiation can preferably be an electronically controllable device which can have in particular a computer, a microcomputer or a programmable chip, e.g. an application-specific integrated circuit (ASIC) or an FPGA (field-programmable gate array), wherein the device can access a computer program configured for carrying out at least one of the present methods. For accurate localization of the interaction region of the optical coupling point, the evaluation unit can be configured to perform a deconvolution of the spatial distribution—predefined by the objective—of the excitation or of the capture of the optical radiation. This can be advantageous in particular if the spatial distribution of the excitation or of the capture in at least one spatial direction has the same or larger dimensions than the cross section of the production region or of the capture region at the relevant point.

For further details with regard to the arrangement for localizing the optical coupling point, in particular regarding the optical component and the associated at least one optical coupling point, reference is made to the rest of the description in this document.

In a further aspect, the present invention relates to a method for producing a microstructure at an optical coupling point. In this case, this method comprises the following steps, which are preferably carried out in the indicated order, beginning with step i) followed by step ii), additional steps likewise being conceivable:
  i) localizing the optical coupling point in accordance with the method described herein for localizing the optical coupling point; and
  ii) producing a microstructure at the optical coupling point by using a manufacturing method, selected from an additive manufacturing method or a subtractive manufacturing method.

After the localization of the optical coupling point, the information thereby determined about the position and the orientation of the optical coupling point can be used for producing a microstructure at the optical coupling point, in particular by the position and the orientation of the microstructure being derived from the information about the localization of the optical coupling point. In one preferred embodiment, the microstructure can be an optical element directly adjacent to the optical coupling point, preferably an optical waveguide or some other micro-optical element. Alternatively, the microstructure or a constituent thereof can be spaced apart from the optical coupling point. One preferred configuration can comprise the manufacture of a microlens, a micromirror or any desired combination of microlenses, micromirrors and other micro-optical components, in particular optical waveguides. The microstructure or a constituent thereof can be very precisely aligned with the relevant coupling point and configured in particular in terms of shape, position and orientation in such a way as to achieve an efficient coupling of light present with a specific amplitude and phase distribution into the optical coupling point through the microstructure. Conversely, light coupled out from the coupling point can be converted to a predefined amplitude and phase distribution by the microstructure or a constituent thereof. Such configurations can be used in particular for optically connecting two optical components, wherein the amplitude distribution and/or phase distribution emitted by a first optical component can be modified in such a way that an efficient input coupling into another optical component can be achieved.

In this case, the term "additive manufacturing method" denotes a production method in which material is attached or applied to an initial structure, while the term "subtractive manufacturing method" denotes an alternative production method in which material is removed from the initial structure. In one preferred embodiment, the material application or material removal can be achieved by using lithographic methods using suitable photoresists, in particular negative or positive resists. Consequently, the above-described optical system for producing or capturing the optical radiation in the interaction region or parts thereof can also be used for lithographically producing the microstructure at the optical coupling point. As mentioned in that context, the optical system can preferably comprise an objective having a high numerical aperture and having a high optical resolution. In one particularly preferred embodiment, the objective is also configured to produce three-dimensional microstructures by using a three-dimensional direct writing lithography method. In this case, the term "three-dimensional direct writing lithography method" denotes a microstructuring method which makes it possible to structure or deposit one or more materials in the form of a three-dimensional pattern or layout in an additive or subtractive manner. It is thus possible to produce three-dimensional structures with an accuracy of preferably better than 1000 nm, particularly preferably better than 500 nm, and very particularly preferably better than 300 nm, where the term "three-dimensional" denotes a possible shaping of the structures in one, two or three spatial directions. In this case, the resolution of the three-dimensional direct writing lithography method can be preferably better than 10 µm, particularly preferably better than 5 µm, and very particularly preferably better than 2 µm or better than 1 µm or 500 nm, where the term "resolution" relates to the largest extent of the smallest structural element producible by the method. The three-dimensional direct writing lithography method can preferably be designed such that it can be carried out under standard atmospheric ambient conditions and a vacuum is not required. What are suitable in particular are additive or subtractive three-dimensional direct writing lithography methods which allow materials to be deposited or removed at a rate of preferably more than 50 µm$^3$/s, more preferably of more than 500 µm$^3$/s, particularly preferably of more than 1000 µm$^3$/s, and very particularly preferably of more than 10 000 µm$^3$/s. In one particularly preferred configuration, the three-dimensional direct writing lithography method can be based on the principle of multi-photon lithography. In one particular configuration, the medium in which the optical radiation to be captured is produced can in this case be provided in the form of an immersion medium which is in direct contact with the coupling point to be localized, in which case the objective may or may not be in contact with the immersion medium itself. In this case, the immersion medium itself can be used as a photoresist for producing the desired microstructures or can be separated from the photoresist by a light-transmissive membrane. In one preferred embodiment, substances which, by using the incident light, allow the optical radiation to be produced in particular by way of light scattering, phosphorescence, fluorescence or luminescence can be introduced into the medium. In the case of a photoresist, it is possible, in particular, to utilize fluorescence properties of an added component of the photoresist, in particular of a photoinitiator, or additionally to add fluorescent dyes. In this case, the excitation of the luminescence or fluorescence can be based on single-photon processes or on multi-photon processes.

For further details with regard to the method for producing a microstructure at an optical coupling point, reference is made to the description of the methods and arrangement according to the invention for localizing an optical coupling point.

Advantages of the Invention

The present invention has a series of advantages over the methods and optical systems known from the prior art. The present methods and arrangement for localizing the optical coupling point and for optionally producing a microstructure enable in particular a precise localization of the at least one optical coupling point, a relative positioning tolerance of better than 1 µm, particularly preferably better than 200 nm, in particular better than 50 nm, being achievable. The term "positioning tolerance" relates to the total of all statistical and systematic deviations from a metrologically ascertained position of the optical coupling point in comparison with its actual position.

In particular by using an interaction process by which the direction of propagation of the light radiated into the production region by the optical coupling point to be localized or the lithography objective can be modified in this way, the present method can make it possible that at least one part of the light radiated into the production region can be captured through the objective or through the coupling point to be localized. In this case, an effective modification of the direction of propagation can preferably be effected by using scattering centers or by luminescent dyes. One particularly preferred configuration comprises a utilization of multi-photon fluorescence, preferably of a photoinitiator, by the lithography system. Since the luminescence is excited here in each case only at the focus of the lithography system, a spatially resolved capture of the interaction region with high resolution in three spatial directions is possible.

BRIEF DESCRIPTION OF THE FIGURES

Further details and features of the present invention are evident from the following description of preferred exemplary embodiments, in particular in conjunction with the dependent claims. In this case, the respective features can be realized by themselves or as a plurality in combination with one another. The invention is not restricted to the exemplary embodiments.

The exemplary embodiments are illustrated schematically in the following figures. In this case, identical reference numerals in the figures denote identical or functionally identical elements or elements that correspond to one another with regard to their functions.

In the figures, specifically:

FIG. 1 shows schematic illustrations of particularly preferred exemplary embodiments of the present method for localizing an optical coupling point;

FIG. 2 shows a schematic illustration of the position, orientation and associated interaction region of the optical coupling point;

FIG. 3 shows a schematic illustration of a further exemplary embodiment, wherein the capture of the localization of an optical coupling point is effected by excitation or capture of luminescence radiation;

FIG. 4 shows a schematic illustration of a further exemplary embodiment, wherein the capture of the localization of an optical coupling point is effected by excitation or capture of scattered radiation;

FIG. 5 shows a schematic illustration of a further exemplary embodiment, wherein the optical coupling point is arranged in a manner offset by a distance from a surface of the optical component;

FIG. 6 shows a schematic illustration of a further exemplary embodiment, wherein the capture of the localization of an optical coupling point is effected by excitation of luminescence radiation or scattered radiation in a core of a waveguide;

FIG. 7 shows one exemplary embodiment of a microstructure produced at the position of the optical coupling point, in the form of a dielectric freeform waveguide;

FIG. 8 shows one exemplary embodiment of a microstructure produced at the position of the optical coupling point, in the form of a microlens;

FIG. 9 shows a further exemplary embodiment, comprising a plurality of optical coupling points;

FIG. 10 shows preferred embodiments for capturing the optical radiation introduced into the optical coupling point or for coupling in the light for exciting the optical radiation in the interaction region of the optical coupling point;

FIG. 11 shows by way of example an interaction region of the coupling point of a surface-illuminated photodiode; and FIG. 12 shows one preferred exemplary embodiment of an arrangement according to the invention for localizing an optical coupling point.

DESCRIPTION OF THE EXEMPLARY EMBODIMENTS

Figure 1A:
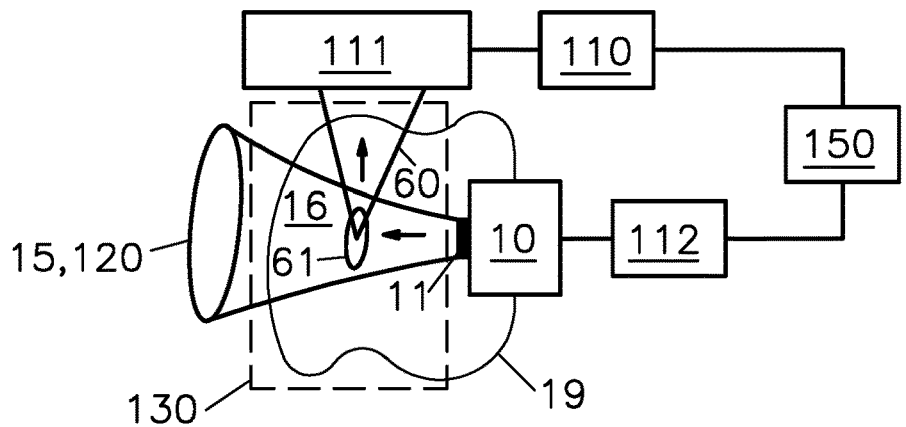
Figure 1B:
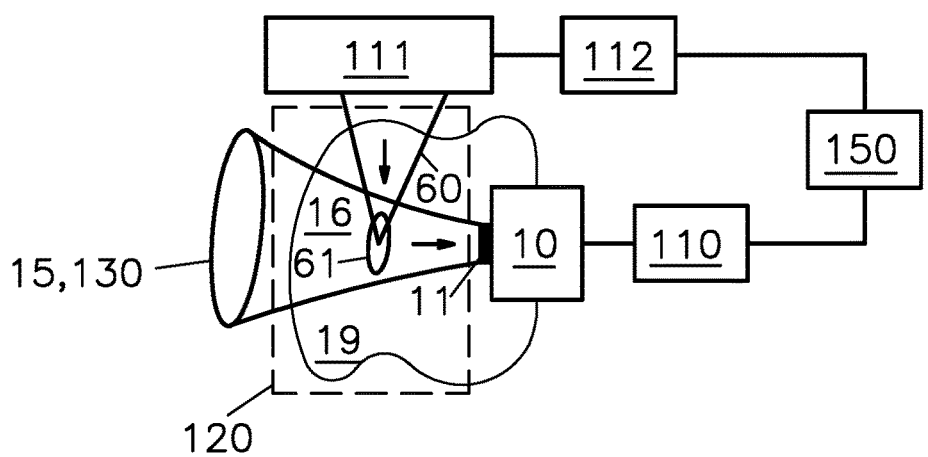

FIGS. 1A and 1B show respective schematic illustrations of two particularly preferred exemplary embodiments of the present method for localizing an optical coupling point 11 comprised by an optical component 10. The coupling point 11 has an associated interaction region 15. The optical component 10 is preferably selected from the group comprising: light guiding single-mode or multimode fibers composed of organic or inorganic materials, semiconductor-based integrated optical chips, in particular lasers, optical amplifiers, photodiodes, superluminescence diodes or silicon photonics chips, integrated optical chips based on semiconductors or dielectric materials, preferably glasses, silicon dioxide, silicon nitride or polymers; optical circuit boards, or optical elements for free space optics, in particular lenses, beam splitters, isolators, thin-film filters, mirrors, or diffraction gratings. The optical components can comprise optical waveguides with low index contrast, e.g. glass-based optical waveguides, or waveguides with medium or high index contrast, e.g. semiconductor-based waveguides. Further types of optical components 10 are conceivable, in particular filters, power splitters or electro-optical modulators.

In accordance with the present method, optical radiation is produced in particular at least in a production region 120, the production region 120 at least regionally overlapping the interaction region 15. The produced optical radiation is captured in a capture region 130, the capture region 130 likewise at least regionally overlapping the interaction region 15. The optical radiation produced at a selected point 16 in a region of overlap between the interaction region 15 and the production region 120 thus interacts with the optical coupling point 11 since
 (1) either light emitted from the optical coupling point 11 can reach the selected point 16 or (2) optical radiation that would be emitted by an isotropically radiating point light source positioned at the selected point 16 is able to be coupled into the optical coupling point 11.

The selected point of the spatial region 15 lies within a so-called "emission region" of the optical coupling point 11 in the first case (1); and within a so-called "acceptance region" of the optical coupling point 11 in the second case.

For this purpose, a medium 19 is used in each case in the embodiment in accordance with FIGS. 1A and 1B, said medium at least partly filling a region of overlap between the production region 120 and the capture region 130. In this case, the medium 19 can particularly preferably comprise a substance configured for producing the optical radiation from the light radiated into the production region 120. The light radiated into the production region 120 preferably serves for producing the desired optical radiation, which can be in particular scattered radiation or luminescence radiation, by using the medium 19 within a partial region of the capture region 130. As illustrated schematically, in this case the medium 19 can wholly or partly fill preferably a region of overlap between the production region 120, the capture region 130 and the interaction region 15 of the optical coupling point 11 to be localized.

In the embodiment in accordance with FIG. 1A, the light for producing the optical radiation is provided by a light source 112 and emitted by using the optical component 10 through the optical coupling point 11 into the interaction region 15 of the coupling point. In this case, the interaction region 15 of the optical coupling point 11 and the production region 120 are preferably congruent at least in the vicinity of the coupling point. At larger distances from the optical coupling point 11, the case can occur that at a point belonging to the interaction region 15 optical radiation cannot be produced by the light emitted by the optical coupling point 11 since the absorption or scattering of the light between the optical coupling point 11 and the relevant point is too great. The light source 112 can preferably be a pulsed light source configured for producing light pulses. Alternatively, a continuous wave light source can also be used. Ascertaining a spatially resolved distribution of the captured optical radiation in the capture region 130 in the embodiment shown in FIG. 1A is effected by using the optical system 111. For this purpose, preferably an objective, preferably a lithography objective, can be used, which effects the capture in each case in a focus cone 60 or only at a focus point 61 or in a finite volume element surrounding the focus point 61 within the capture region 130. The position of the focus cone 60, of the focus point 61 or of the associated volume element can preferably be varied by using a beam scanner comprised by the optical system 111 during the capture process, for example in the form of a one-, two- or three-dimensional scanning process. The optical radiation captured by using the optical system 111 is passed for evaluation to a measuring unit 110, which can be embodied in particular in the form of a power detector. Additionally or alternatively, the measuring unit 110 can comprise a camera sensor or a one-dimensional or multi-dimensional detector array.

In the embodiment in accordance with FIGS. 1A and 1B, the desired localization of the optical coupling point 11 is effected from the spatially resolved distribution of the captured optical radiation within the capture region 130, said distribution being ascertained by using the measuring unit 110. This is done using an evaluation unit 150 configured for determining the localization of the optical coupling point 11 from the captured spatially resolved distribution of the optical radiation.

In the embodiment in accordance with FIG. 1B, the light provided by the light source 112 for producing the optical radiation is emitted into the production region 120 by using the optical system 111. For this purpose, preferably an objective, particularly preferably a lithography objective, can be used, which effects the production of the optical radiation in each case in the focus cone 60 or only at a focus point 61 or in a volume element surrounding the focus point 61 within the production region 120. In this embodiment, capturing the spatially resolved distribution of the optical radiation in the capture region 130 is effected through the optical coupling point 11, which captures the optical radiation produced in the production region 120, provided that said optical radiation can be coupled into the optical coupling point 11, by using the measuring unit 110, which can be embodied in particular in the form of a power detector, and which can additionally or alternatively comprise a camera sensor or a detector array. In this case, the interaction region 15 of the optical coupling point and the capture region 130 are preferably congruent at least in the vicinity of the coupling point. At larger distances from the coupling point, the case can occur that the optical radiation produced at a point belonging to the interaction region 15 does not reach the optical coupling point 11, or reaches it only with large losses, since the absorption or the scattering of the optical radiation between the relevant point and the optical coupling point 11 is too great.

In the case of the embodiment shown in FIG. 1B, ascertaining a spatially resolved distribution of the captured optical radiation in the capture region 130 is effected by virtue of the fact that the position of the focus cone 60, of the focus point 61 or of the associated volume element is preferably varied by using a beam scanner comprised by the optical system 111 during the capture process, for example in the form of a one-, two- or three-dimensional scanning process, within the production region 120 and the optical radiation captured by using the measuring unit 110 is ascertained continuously in the course of this. The storage and evaluation of the data and the ascertainment of the position and orientation of the optical coupling point 11 are effected with the aid of the evaluation unit 150 configured for determining the localization of the optical coupling point 11 from the captured spatially resolved distribution of the optical radiation.

Irrespective of the type of embodiment in accordance with FIG. 1A or 1B, the optical radiation or the light that produces the optical radiation is guided in a manner such that the optical radiation or the light that produces the optical radiation actually traverses the optical coupling point 11. Only in this way can it be ensured that the spatially resolved distribution of the captured optical radiation actually indicates the localization of the optical coupling point 11 by virtue of the captured optical radiation being related to the optical coupling point 11 to be localized.

Figure 2:
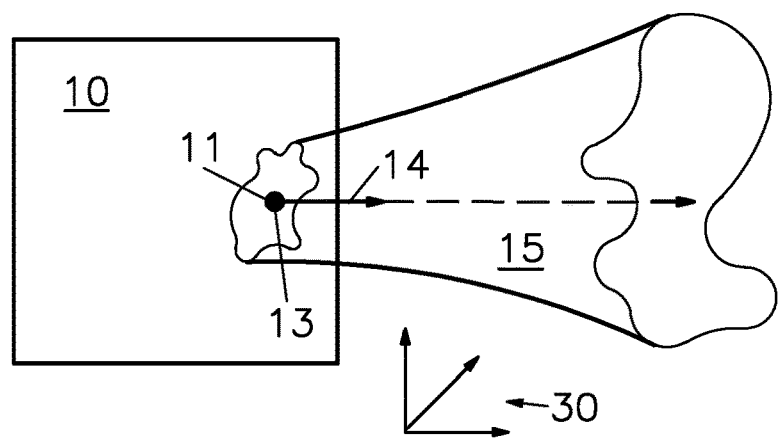

The localization of the optical coupling point 11 can comprise an indication of position 13 and orientation 14 of the optical coupling point 11, which are illustrated schematically in FIG. 2 together with the associated interaction region 15 of the optical coupling point 11. In this case, the indications concerning the spatial position 13 of the optical coupling point 11 can comprise a position vector in a three-dimensional coordinate system 30, while the indications concerning the orientation 14 of the optical coupling point 11 can comprise one or more three-dimensional orientation vectors, one of the orientation vectors indicating for example a direction in which the light can be emitted from the optical coupling point 11 or from which an efficient input coupling of the light into the optical coupling point 11 is possible. Particularly preferably, both the position vector and the orientation vector are indicated in the same coordinate system 30. In the case of a plurality of orientation vectors, one of the orientation vectors can define a rotational orientation of the coupling point in relation to an optical axis, which is determined for example by the polarization of the light emitted by the coupling point or of the light captured thereby.

The position 13 and the orientation 14 of the optical coupling point 11 are determined by using the evaluation unit 150 preferably by way of at least one of the following measures. A first measure can comprise verifying an appearance or disappearance, in particular an abrupt appearance or disappearance, of the captured optical radiation at a location within the capture region 130. A further measure can comprise capturing the profile, for example the rise or fall of the captured spatially resolved distribution of the optical radiation in the capture region. A further measure can comprise applying a model for the optical coupling point 11, for the position-dependent input coupling of the optical radiation in the production region 120 into the optical coupling point 11 or for the distribution of the light emitted from the optical coupling point 11 for the purpose of producing the optical radiation. Further measures are conceivable, however. In very simple cases, such models can be based on the theory of so-called Gaussian beams, for example, which assumes a paraxial approximation of the beam propagation. Other models can make use of methods of Fourier optics or the numerical description of optical field propagation.

Figure 3:
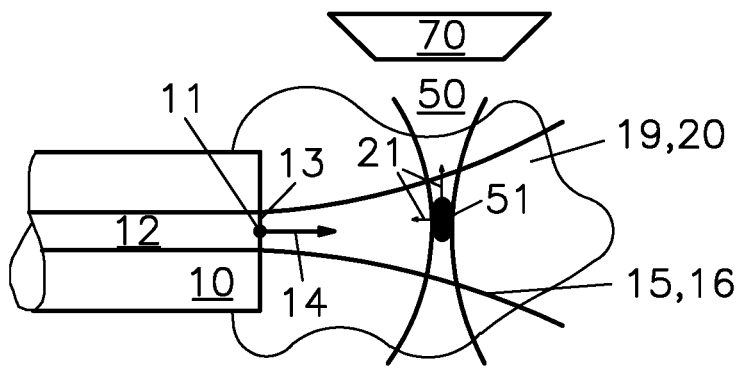

FIG. 3 schematically shows a further exemplary embodiment of the present method, in which the spatial position 13 and the orientation 14 of the coupling point 11 comprised by the optical component are captured by excitation or capture of luminescence radiation 21 in a volume element surrounding a focus point 51 of a beam 50 received or emitted from an objective 70. Spatial displacement of the volume element around the focus point 51, in particular by using a beam scanner, enables the spatially resolved distribution of the captured optical radiation to be ascertained within the capture region 120, which is at least partly filled by the medium 19. In one preferred embodiment, the objective 70 can also be used for lithographically producing microstructures. In one preferred embodiment, the capture region 120 can be at least partly filled with a substance 20 configured for producing luminescence, said substance playing the part of the medium 19. This can involve a photoresist, for example, which already exhibits multi-photon fluorescence upon irradiation below the polymerization threshold. In the simple case of an optical waveguide 12 with a facet perpendicular to the waveguide axis, the orientation 14 of the optical coupling point 11 corresponds to an optical axis of a section of the optical waveguide 12 which is adjacent to the optical coupling point 11. In this case, the luminescence radiation 21 can be excited either through the optical coupling point 11 or through the lithography objective 70.

Figure 4:
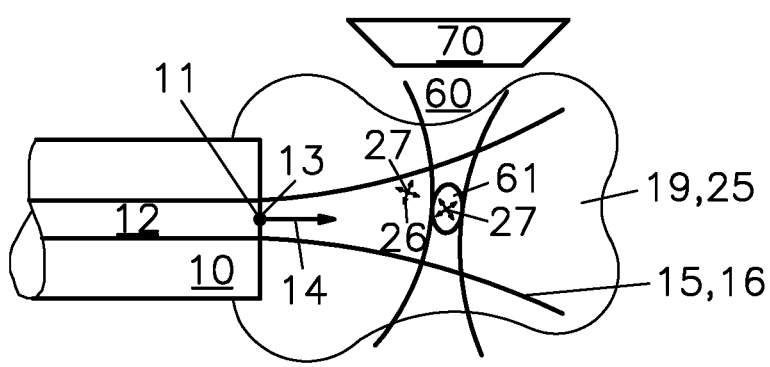

FIG. 4 schematically shows a further exemplary embodiment of the present method, in which the spatial position 13 and the orientation 14 of the coupling point 11 comprised by the optical component are captured by the excitation or the capture of scattered radiation 26 in a volume element surrounding the focus point 61 of a beam 60 received or emitted from an objective 70. With regard to a spatial distribution of the volume element, in particular in the context of a one- or multi-dimensional scanning process, the statements made in the description concerning FIG. 3 are applicable. Here, too, in one preferred embodiment, the objective 70 can also be used for lithographically producing microstructures. The scattered radiation 26 can preferably be produced by using scattering centers 27 which scatter the light radiated into the volume element 61 in such a way that the scattered radiation thereby produced can be at least partly captured. In the simple case of an optical waveguide 12, the orientation 14 of the optical coupling point 11 corresponds to an optical axis of a section of the optical waveguide 12 which is adjacent to the optical coupling point 11. In this case, the scattered radiation 21 can be excited either through the optical coupling point 11 or by using the lithography objective 70.

Figure 5:
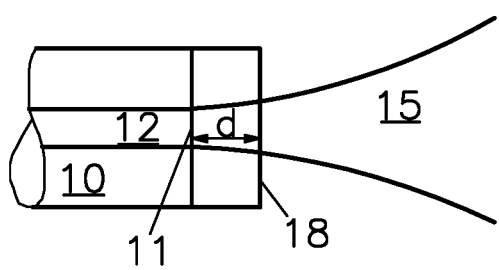

In a further embodiment in accordance with FIG. 5, the optical coupling point 11 is not situated on a surface of the optical component 10, but rather here by way of example is arranged in a manner offset by a distance d from the surface of the optical component 10. This case can occur in the context of a facet of the waveguide 12, for example, which has an offset by the distance d with respect to a chip edge 18. In this case, a vertex of the conical spatial region 15 lies within the optical component 10. In this context, the medium 19 is in direct contact with the surface of the optical component 10. In this case, the position of the chip edge 18 in relation to the position of the optical coupling point 11 can be ascertained as a result of an abrupt disappearance or an abrupt fall of the captured optical radiation at the chip edge 18.

Figure 6:
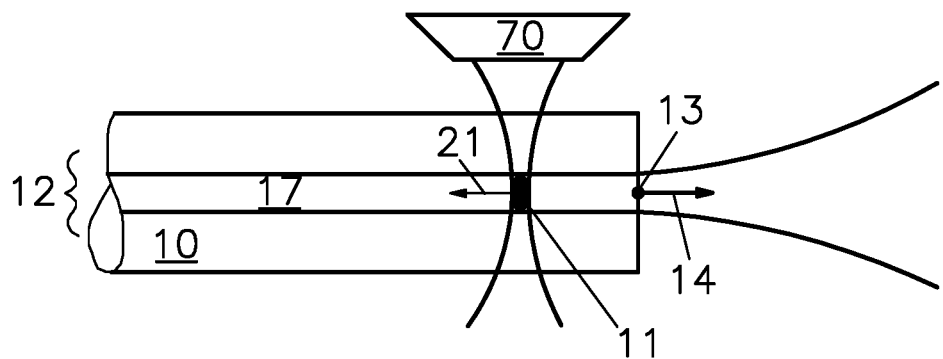

FIG. 6 shows a further exemplary embodiment, in which the position 13 and the orientation 14 of the optical coupling point 11 formed by the waveguide 12 of the optical component 10 are captured by excitation of luminescence radiation 21 in a waveguide core 17 of a waveguide 12 itself. In this case, the waveguide core 17 preferably comprises a substance configured for producing the luminescence radiation 21. Additionally or alternatively, the waveguide core 17 can comprise a further substance configured for producing scattered radiation (not illustrated).

Figure 7:
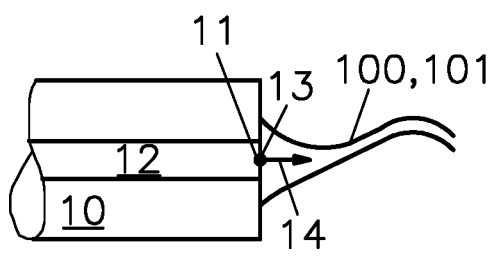
Figure 8:
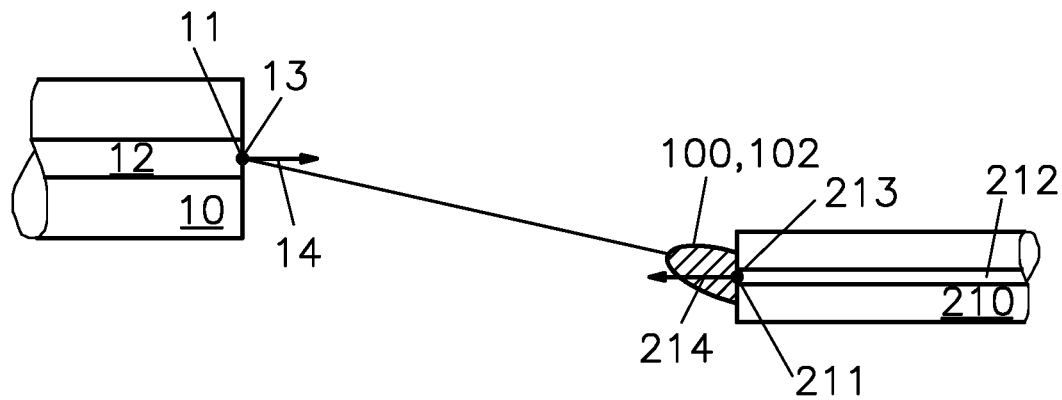

FIGS. 7 and 8 schematically show microstructures 100 produced by the present method for producing a microstructure at an optical coupling point and having an alignment with the optical coupling point 11 which is precise in regard to the position 13 and the orientation 14.

FIG. 7 shows a microstructure 100 produced at the position 13 of the optical coupling point 11, in the form of a dielectric freeform waveguide 101, also referred to as a "photonic wire bond", the dielectric freeform waveguide 101 being aligned in regard to the position 13 and the orientation 14 of the optical coupling point 11.

FIG. 8 shows a further microstructure 100 in the form of a microlens 102 situated at a further optical coupling point 211 formed by a further optical waveguide 212 of a further optical component 210, the further optical coupling point 211 not being in direct contact with the already captured optical coupling point 11 comprised by the optical component 10. In this case, position 213 and orientation 214 of the further optical coupling point 211 can also be used for the configuration of the microstructure 100. The microstructure 100 is configured on the basis of the positions 13, 213 and the orientations 14, 214 of the two optical coupling points 11, 211 in such a way that an efficient coupling between the two optical coupling points 11, 211 arises as a result. In addition to the exemplary embodiment in accordance with FIG. 8, for an efficient coupling it may also be advantageous to produce microstructures 100 at both optical coupling points 11, 211, the position and the orientation of both optical coupling points 11, 211 being used for the configuration of each of the microstructures 100.

Figure 9:
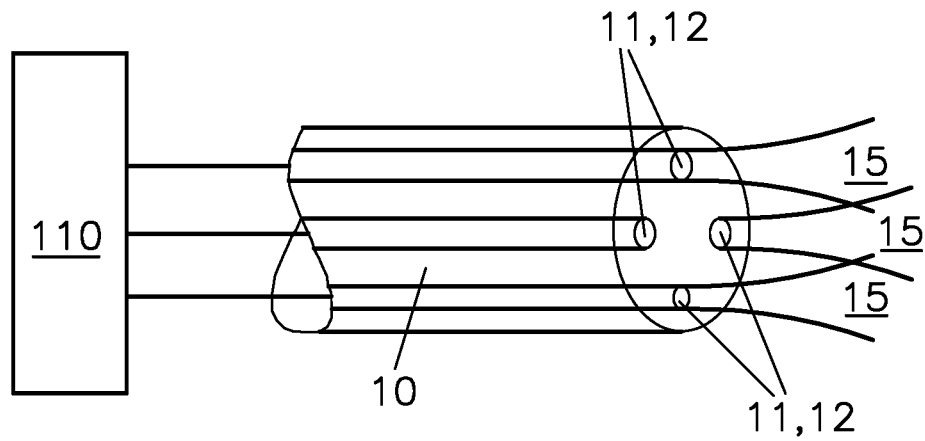

FIG. 9 shows a further exemplary embodiment, in which a plurality of optical coupling points 11 are defined by facets of the waveguide cores 12 of a multi-core fiber. In this embodiment, for example, the optical radiation coupled overall into all of the fiber cores can be ascertained integrally by the common measuring unit 110, the active area of which extends over all of the waveguide cores of the multi-core fiber.

Figure 10:
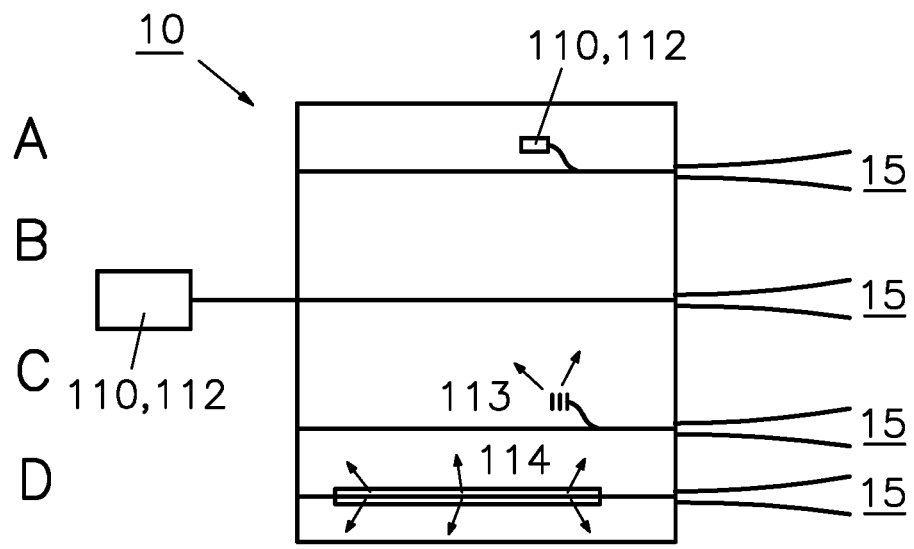

FIG. 10 schematically shows various preferred embodiments for capturing the optical radiation introduced into the optical coupling point 11 of the optical component 10 or for coupling in the light suitable for exciting the optical radiation in the interaction region 15 of the optical coupling point 11. However, further embodiments, not illustrated here, are likewise possible.

In the embodiment in accordance with FIG. 10A, for this purpose, the optical component 10 can comprise the light source 112 or the measuring unit 110, the light source 112 or the measuring unit 110 having an optical connection to the optical coupling point 11 to be localized.

In the embodiment in accordance with FIG. 10B, for this purpose the light source 112 or the measuring unit 110 can be arranged outside the optical component 10 and comprise a connection to the optical component 10, preferably in the form of an optical waveguide or an optical fiber.

In the embodiment in accordance with FIG. 10C, the optical component 10 can have coupling structures 113, e.g. in the form of so-called grating couplers, by which light or the captured optical radiation can be coupled out of the optical component 10 or coupled into the optical component 10. In this case, light coupled in or optical radiation coupled out can be captured or provided either by the lithography objective 70 itself, by a further objective (not illustrated) or by a further optical element, preferably an optical fiber, or a light source, preferably a photodiode (not illustrated). In this case, the grating couplers can be designed such that they have a high coupling efficiency for the wavelength of the light transferred in the context of the present method or of the associated optical radiation, while they do not influence, or do not critically influence, optical signals at the operating wavelength of the optical component 10.

In the embodiment in accordance with FIG. 10D, scattered radiation or luminescence radiation occurring within the waveguide 12 can be captured, preferably by using the objective 70 itself or by a further objective. The production of scattered radiation can be achieved here by suitable scattering structures, for example on the basis of periodic structures. These structures can be designed such that they have a high scattering efficiency for the wavelength of the light transferred in the context of the present method, while they do not influence, or do not critically influence, optical signals at the operating wavelength of the optical component 10.

Figure 11:
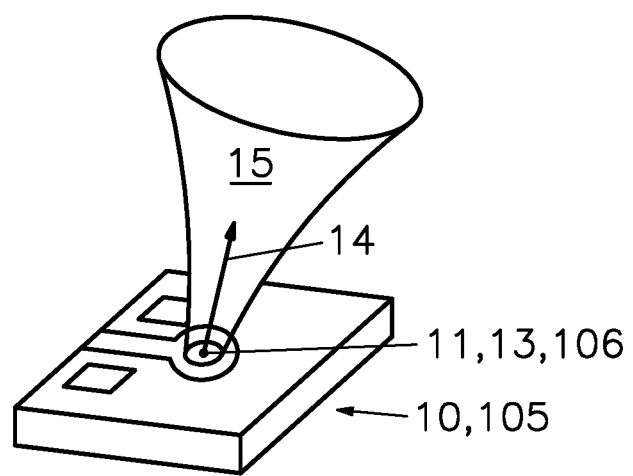

FIG. 11 shows by way of example the interaction region 15 of a surface-illuminated photodiode 105. In this case, the optical coupling point 11 corresponds to an active area 106 of the photodiode 105, while the normal vector of the active area 106 of the photodiode 105 is usually regarded as the orientation of the optical coupling point 11.

Figure 12:
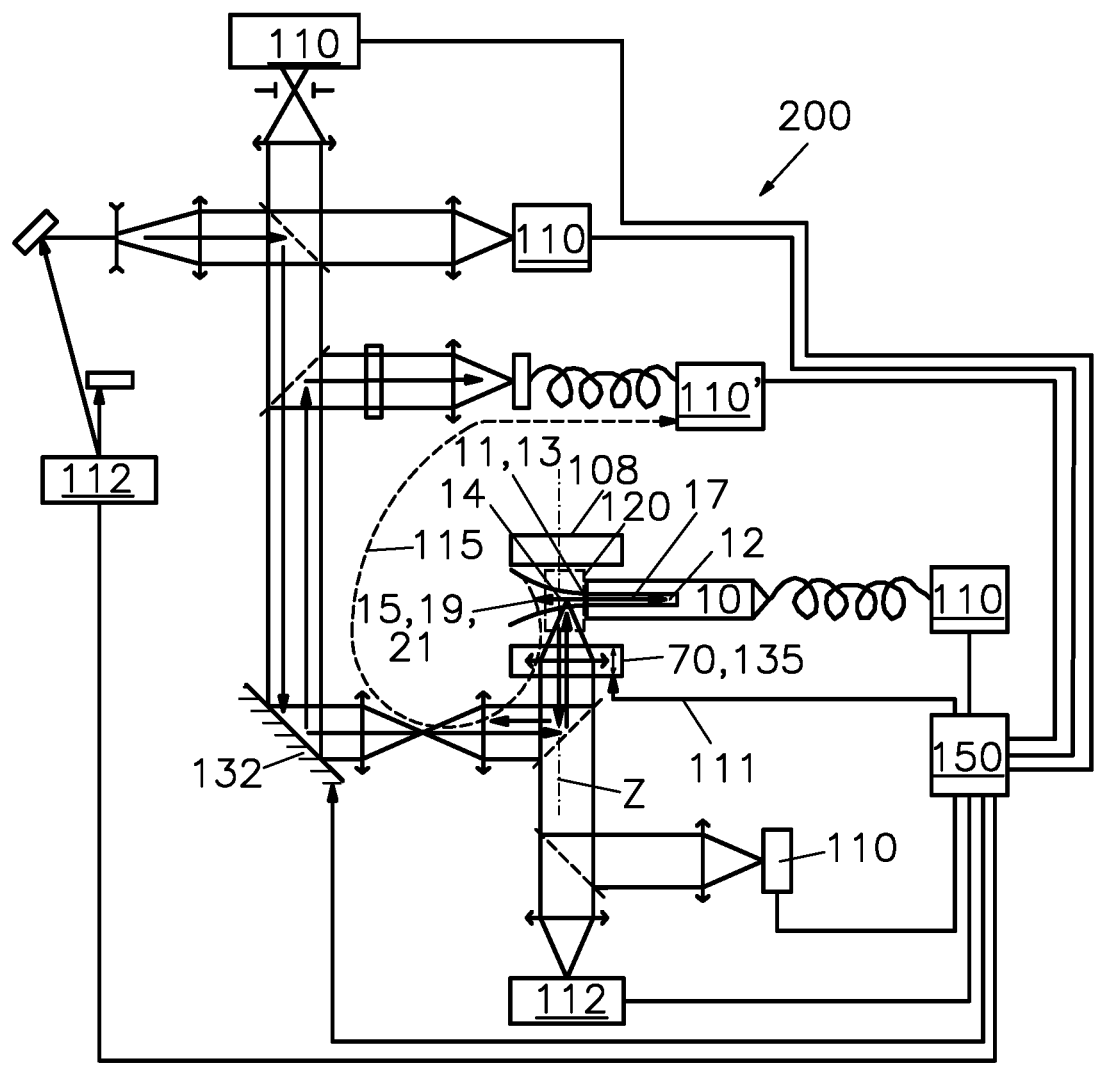
Figure 12:
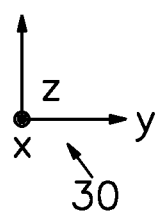

FIG. 12 schematically shows one preferred exemplary embodiment of an arrangement 200 according to the invention for localizing the optical coupling point 11 in the optical component 10, which is arranged on an optical table 108 configured to be movable in x-, y- and z-directions. The arrangement 200 is based on a three-dimensional laser lithography system with fast beam deflection by a beam scanner 132, preferably in the form of a so-called "galvo-scanner", which has been extended by further detection channels for the optical radiation. In this case, the light source 112 comprises a femtosecond laser having an emission wavelength of 780 nm, a pulse duration of approximately 100 fs and a repetition rate of approximately 100 MHz. In order to implement the method for localizing the optical coupling point 11, the fluorescence radiation 21 is produced by using multi-photon excitation, the light used for the excitation being radiated into the production region 120 partly by way of the beam path of the lithography system. In this case, the light used for the excitation can be produced either by the same light source 112 that is also used for the lithographic structuring, or else by an additional light source, which can be coupled into the beam path via a further beam splitter (not illustrated). The medium 19 used here is a photoresist, with which fluorescent dyes can additionally be admixed. For the purpose of localizing the optical coupling point 11, in this case selected parameters, in particular the power, the wavelength and/or the pulse duration of the light radiated into the medium 19, are set such that the dose introduced as a result is preferably still below the dose threshold with respect to a polymerization that is undesired during the detection. In this case, part of the fluorescence radiation 21 produced within the production region 120 couples into the optical coupling point 11. In the present exemplary embodiment, the optical component comprises the at least one optical waveguide 12, for example in the form of an optical fiber, which comprises the at least one waveguide core 17. The waveguide 12 is connected to the measuring unit 110, which here can be embodied in the form of a photomultiplier tube and which metrologically captures the fluorescence radiation 21 coupled into the at least one waveguide core 17 in a manner dependent on the spatial position of the focus point of the lithography system that is used for the excitation. In the case of a multi-core fiber, the total of the fluorescence radiation 21 coupled into the various waveguide cores 17 can be captured integrally by using the measuring unit 110 in the form of a photomultiplier tube in accordance with FIG. 9.

As an alternative thereto, the light source 112 suitable for exciting the optical radiation can be connected to at least one of the waveguide cores 17 (not illustrated). The optical radiation is then captured through the objective 70 and fed to a further measuring unit 110' in the form of a photomultiplier tube via an arrangement referred to as a fluorescence path 115. In this embodiment, the entire fluorescence path 115 is formed by the objective 70 and, upstream thereof, the lenses and also beam splitters and can additionally contain the beam scanner 132. The temporally resolved signal of the measuring units 110, 110' is digitized. From the focus positions in all three spatial directions, which focus positions are set by using the beam scanner 132 and thus known, the captured optical radiation can thus be ascertained in a spatially resolved manner and the orientation and position of the at least one waveguide core 17 can be determined therefrom.

Furthermore, as illustrated schematically in FIG. 12, the arrangement 200 can comprise further optical, optoelectronic or electronic elements, in particular further measuring units 110, light sources 112, lenses, mirrors, beam splitters or filters.

The arrangement 200 was used successfully for measuring the position 13 and the orientation 14 of the optical coupling point 11 of single-core fibers and multi-core fibers.

The aim of one exemplary embodiment was to recognize the coupling points 11 of a seven-core fiber. In contrast to customary single-core fibers, multi-core fibers are not symmetrical in relation to an arbitrary rotation about a fiber axis, and so the position 13 of the waveguide cores 17 after the mounting thereof usually remains indefinite. For the purpose of detecting the waveguide cores 17, multi-photon fluorescence radiation was excited by using the lithography objective 70 in a volume disposed upstream of an end facet of the multi-core fiber and was captured integrally over all seven waveguide cores 17 by using the measuring unit 110 in the form of a photomultiplier tube connected to the multi-core fiber. For the purpose of measuring the spatially resolved distribution of the fluorescence radiation, the exciting light beam was firstly moved laterally by using the beam scanner 132 in a focal plane of the lithography objective 70. Furthermore, the focal plane itself was moved relative to the optical multi-core fiber by using an axial displacement of the objective in the z-direction by the objective drive 135. The position 13 and the orientation 14 of the optical coupling points 11 assigned to the individual waveguide cores 17 can be ascertained from the three-dimensionally spatially resolved distribution of the fluorescence radiation captured by the multi-core fiber. In addition, part of the excited fluorescence radiation can be captured by the lithography objective 70 itself and used for imaging purposes. In this regard, in the evaluation unit 150 the recorded measurement data can both be used to determine the topology of the optical component 10 and serve to attain a refined determination of the position 13 and the orientation 14 of the optical coupling point 11.

The arrangement illustrated in FIG. 12 can also be used in slightly modified form to implement the method for producing a microstructure (not illustrated here) at the optical coupling point 11. For this purpose, the parameters, in particular the wavelength, the power or the pulse duration of the light emitted by the light source 112, can be varied in such a way that a polymerization of a photoresist in a spatial element in the vicinity of the focus point of the lithography beam becomes possible. By using a movement of the focus point with simultaneous variation of the incident light, spatially selectively solidified volume regions can thus be produced, the totality thereof forming the desired microstructure. In this case, the polymerization can be based on single- or multi-photon absorption processes. In one particular embodiment, the light source can comprise a femtosecond laser, the output power of which can be varied either directly or by using an external modulator, preferably an acousto-optical modulator. In addition, the light source can comprise an adjustable pulse compressor that makes it possible to vary the pulse duration of the light radiated into the photoresist.

In a representation of the distribution of the two-photon fluorescence power verified through the multi-core fiber in a plane at the level of the central waveguide core 17 perpendicular to the z-direction, which corresponds to the direction along the optical axis of the lithography objective 70, the fluorescence may fall abruptly at the transition between the medium 19 and the fiber facet since excitation of two-photon fluorescence is not possible within the optical component 10. In this case, the abrupt fall of the captured optical radiation can be used for a precise localization of the fiber facet serving as the optical coupling point 11. By recording a stack of images at different z-positions, it is thus possible to achieve a three-dimensionally spatially resolved capture of the two-photon fluorescence over a volume. As a result, virtual sections in planes perpendicular to an axis of the multi-core fibers also become possible, in which the seven cores of the multi-core fiber are clearly recognizable. It is particularly noticeable in this case that the cross section of the fiber cores can be precisely derived from the distribution of the luminescence radiation 21 directly at the optical coupling point 11. In addition, a spatial distribution of that part of the luminescence radiation 21 which is captured by the lithography objective 70 itself can analogously be captured in an image stack constituted from different focus levels, from which the topology of the fiber is recognizable, but not the positions 13 of the respective coupling points 11.

LIST OF REFERENCE SIGNS 10, 210 Optical component
11, 211 Optical coupling point
12, 212 Optical waveguide (fiber), associated with the coupling point
13, 213 Position of the coupling point
14, 214 Direction of the coupling point
15 Interaction region of the coupling point
16 Point in the overlap region
17 Waveguide core
18 Chip edge
19 Medium (interaction medium)
20 Substance, configured for producing luminescence
21 Luminescence radiation (fluorescence radiation)
25 Substance, configured for producing scattering
26 Scattered radiation
27 Scattering center
30 Coordinate system
40 Produced microstructure
50 Focused laser beam for producing the luminescence
51 Focus point
60 Imaging focus cone of the lithography objective
61 Focus point
70 Objective (lithography objective)
100 Microstructure
101 Aligned dielectric waveguide
102 Aligned microlens
105 Surface-illuminated photodiode
106 Active area of the surface-illuminated photodiode
108 Optical table
110, 110' Measuring unit
111 Optical system for producing or capturing optical radiation
112 Light source (pulsed light source)
113 Coupling structure
114 Scattering by the waveguide
115 Fluorescence path
120 Capture region of the optical radiation
130 Production region of the optical radiation
132 Beam scanner
135 Objective drive
150 Evaluation unit
200 Arrangement for localizing an optical coupling point

The invention claimed is:

1. A method for localizing an optical coupling point, comprising the following steps:
   a) providing an optical component comprising an optical coupling point, wherein the optical coupling point has an interaction region lying outside a volume encompassed by the optical component;
   b) producing optical radiation in a production region, wherein the production region at least partly overlaps the interaction region of the optical coupling point, wherein light impinges on a medium situated in the production region, said light being modified by the medium in a manner that the optical radiation is thereby produced;

c) capturing at least one part of the produced optical radiation in a capture region wherein the capture region at least partly overlaps the interaction region of the optical coupling point, and ascertaining a spatially resolved distribution of the captured part of the produced optical radiation;

d) determining the localization of the optical coupling point from the ascertained spatially resolved distribution of the captured part of the produced optical radiation, wherein producing the optical radiation or capturing at least the part of the produced optical radiation is effected through the optical coupling point;

wherein the medium comprises scattering centers, a luminescent substance, or a photoinitiator that forms the luminescent substance, wherein the scattering centers produce scattered radiation, or wherein the luminescent substance produces luminescence radiation; and wherein the medium furthermore comprises a photoresist, wherein a dose that is below a dose threshold for polymerization of the photoresist is introduced into the photoresist for a purpose of producing the optical radiation.

2. The method of claim 1, wherein the luminescence radiation is produced by excitation of a multi-photon absorption process in the luminescent substance.

3. The method of claim 1, wherein the light for producing the optical radiation is emitted into the production region by using the optical coupling point.

4. The method of claim 3, wherein the optical component comprises an optical waveguide, wherein the optical waveguide feeds the light to the optical coupling point.

5. The method of claim 1, wherein capturing the optical radiation or radiating of the light for producing the optical radiation into the production region is effected through an objective, wherein the objective has a numerical aperture of at least 0.3.

6. The method of claim 1, wherein the radiating of the light into the production region or the capturing of the produced optical radiation in the capture region is spatially altered, and wherein capturing the spatially resolved distribution of the optical radiation is effected through the optical coupling point.

7. The method of claim 6, wherein the spatial change of the radiating of the light into the production region or the capture of the produced optical radiation in the capture region is effected by using a beam scanner.

8. The method of claim 1, wherein the localization of the optical coupling point comprises an indication of a position and an orientation of the optical coupling point, wherein the position and the orientation of the optical coupling point are determined by at least one of the following measures:

verifying an appearance or a disappearance of the captured optical radiation at a location within the capture region;

evaluating the spatially resolved distribution of the captured part of the produced optical radiation in the capture region;

applying a model for the optical coupling point for a position-dependent input coupling of the optical radiation in the production region into the optical coupling point or for a distribution of the light emitted from the optical coupling point for the purpose of producing the optical radiation.

9. A method for producing a microstructure at an optical coupling point of an optical component, comprising the following steps:

i) localizing an optical coupling point in accordance with the method of claim 1; and ii) producing a microstructure at the optical coupling point by using a manufacturing method selected from an additive manufacturing method or a subtractive manufacturing method.

10. The method of claim 9, wherein an objective is used both for localizing the optical coupling point and for producing the microstructure at the optical coupling point, wherein the objective has a numerical aperture of at least 0.3.

11. An arrangement for localizing an optical coupling point, comprising an optical component comprising at least one optical coupling point, wherein the optical coupling point has an interaction region lying outside a volume encompassed by the optical component;

an optical device configured for at least one of producing optical radiation in a production region or capturing at least one part of the produced optical radiation in a capture region, wherein the production region and the capture region at least partly overlap the interaction region of the optical coupling point;

an evaluation unit configured for ascertaining a spatially resolved distribution of a captured part of the optical radiation and for determining the localization of the optical coupling point from the ascertained spatially resolved distribution of the captured part of the optical radiation, wherein the arrangement is configured in a manner that producing the optical radiation or capturing at least the part of the produced optical radiation is effected through the optical coupling point;

a medium situated in the production region, wherein light impinges on the medium situated in the production region, said light being modified by the medium in a manner that the optical radiation is thereby produced;

wherein the medium comprises scattering centers, a luminescent substance, or a photoinitiator that forms the luminescent substance, wherein the scattering centers produce scattered radiation, or wherein the luminescent substance produces luminescence radiation; and wherein the medium furthermore comprises a photoresist, wherein a dose that is below a dose threshold for polymerization of the photoresist is introduced into the photoresist for a purpose of producing the optical radiation.

12. The arrangement of claim 11, wherein the optical device comprises a light source configured for producing light which, upon impinging on a medium situated in the production region, is modified by the medium in a manner that the optical radiation is produced thereby.

13. The arrangement of claim 11, wherein the optical device furthermore comprises a beam scanner configured to effect a spatial change of the radiating of the light into the production region or of the capture of the produced optical radiation in the capture region.

14. The arrangement of claim 11, wherein the optical device is furthermore configured for producing a microstructure at the optical coupling point.

* * * * *